J. F. O'CONNOR.
FLEXIBLE COUPLING FOR SHAFTING.
APPLICATION FILED SEPT. 5, 1919.
1,345,394.
Patented July 6, 1920.
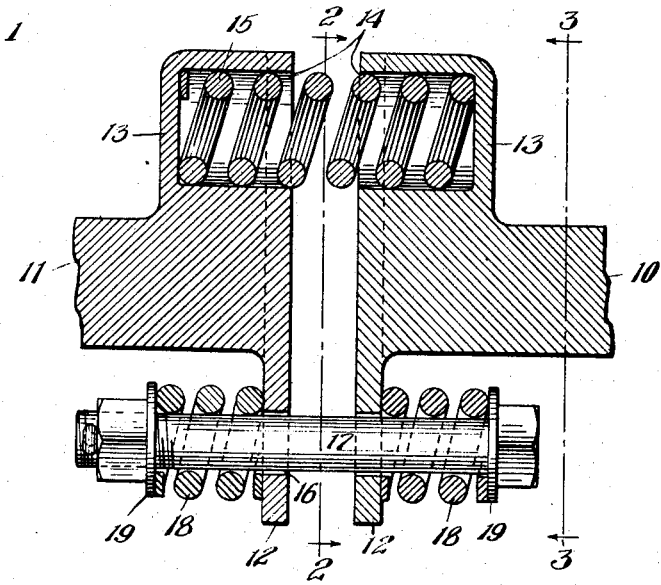
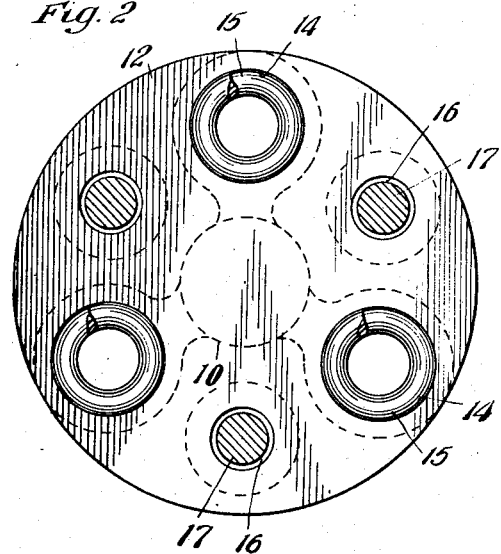
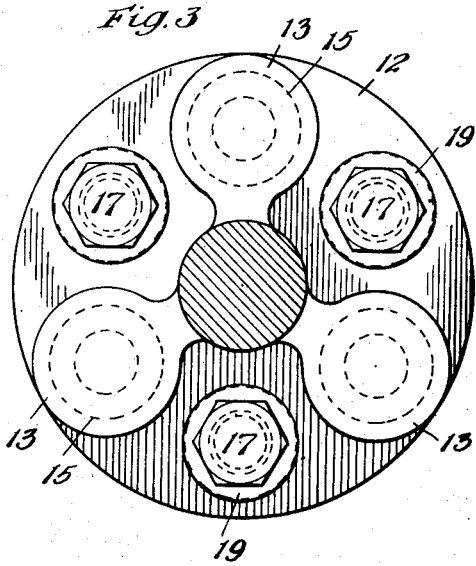
Witnesses
Inventor
John F. O'Connor

UNITED STATES PATENT OFFICE.

JOHN F. O'CONNOR, OF CHICAGO, ILLINOIS, ASSIGNOR TO WILLIAM H. MINER, OF CHAZY, NEW YORK.

FLEXIBLE COUPLING FOR SHAFTING.

1,345,394. Specification of Letters Patent. Patented July 6, 1920.

Application filed September 5, 1919. Serial No. 321,752.

*To all whom it may concern:*

Be it known that I, JOHN F. O'CONNOR, a citizen of the United States, residing at Chicago, in the county of Cook and State of Illinois, have invented a certain new and useful Improvement in Flexible Couplings for Shafting, of which the following is a full, clear, concise, and exact description, reference being had to the accompanying drawings, forming a part of this specification.

This invention relates to improvements in flexible coupling for shafting.

The object of the invention is to provide a simple and efficient coupling of a flexible nature for shafting and by which power is transmitted from a driving shaft to a driven shaft and overcome such difficulties as occur due to improper alinement.

In the drawings forming a part of this specification, Figure 1 is a sectional view through portions of the driven and driving shafts showing my improvements in connection therewith. Fig. 2 is a sectional view taken substantially on the line 2—2 of Fig. 1, and Fig. 3 is a sectional view taken substantially on the line 3—3 of Fig. 1.

In said drawing, portions of driving and driven shafts are shown and it is evident that it is immaterial which of said shafts is the driving shaft. For convenience, I represent the driving shaft as the right hand one indicated by the reference numeral 10 and the driven shaft as 11. The portions which I have shown and referred to as the driven and driving shafts may be castings or forgings in the form of fittings rigidly secured to the actual driving and driven shafts proper or the driving and driven shafts may be integrally formed as shown in the drawing.

To provide the flexible coupling, the opposed ends or fixtures of the driving and driven shafts are preferably similarly formed and each has a circular flange indicated at 12 on the outer face of which is provided a plurality of integral cups or pockets 13, the same being spaced equal distances apart and by preference three of the same will be employed. Said cups or pockets 13 are of course hollow and open at their inner ends as indicated at 14 and in said pockets are seated coiled springs 15 which are normally placed therein under compression so as to exert an expanding and separating force between the two shafts.

At points intermediate the cups 13, the disk flanges 12 are perforated as indicated at 16 to accommodate relatively heavy bolts 17 that extend parallel to the axes of the two shafts. Said bolts 17 are of somewhat lesser diameter than the diameters of the holes 16 so as to permit a predetermined limited amount of relative movement therebetween. Mounted on the said bolts, one on each end thereof, are springs 18, the same bearing at their inner ends against the flanges 12 and held at their outer ends by washers 10 and the heads of the bolts and nuts. The springs 18 are also placed under an initial compression so as to exert pressure on the flanges in a direction tending to force the latter toward each other.

In carrying out my invention, the springs 15 and 18 will be so proportioned as to ultimately neutralize each other and leave the flanges 12 normally a short distance apart as indicated in the drawing. In transmitting power from the shaft 10 to the shaft 11 it is evident that a slight relative rotative movement is permissible and also that provision is made for the relative approach or separation of the flanges so that the axes of the two shafts may extend at an angle to each other in which case the flanges would approach each other on one side and separate on the opposite side, this condition constantly changing as the two shafts rotate.

It will be noted that the connection is such as to permit of extension and contraction in the length of the shaft in addition to the flexibility. This is of importance on trucks and automobiles, for which my improvements are particularly adapted.

I claim:

1. A flexible coupling comprising, rotatable driving and driven members having adjacent ends, means interposed between said members tending to yieldingly separate the same, and means associated with said members tending to yieldingly move said members toward each other, both of said means being arranged to permit relative rotation between said members for a limited extent.

2. A flexible and contractible and extensible coupling comprising, rotatable driving and driven members having adjacent ends, balanced sets of spring means associated with said members, one set tending to separate and the other set to force together the adjacent ends of said members.

3. A flexible coupling comprising, rotatable driving and driven members having adjacent opposed ends, a set of springs interposed between said ends of said members, another set of springs acting against the ends of said members in a manner to force them together, said sets of springs being arranged to permit a limited amount of relative rotation between said members.

4. A flexible coupling comprising, rotatable driving and driven members having opposed adjacent flanged ends normally separated, said flanges being provided with sets of opposed hollow cups open at their adjacent ends, springs seated within said cups and extending from one pair to the other, said flanges being perforated at intervals, bolts extending through said perforations and of smaller diameter than the latter to permit slight relative movement therebetween, and springs mounted on said bolts and bearing against the opposed outer sides of said flanges.

In witness that I claim the foregoing I have hereunto subscribed my name this 20th day of August, 1919.

JOHN F. O'CONNOR.